(12) United States Patent
Rosas Vazquez et al.

(10) Patent No.: US 11,897,427 B2
(45) Date of Patent: Feb. 13, 2024

(54) MULTIFUNCTIONAL CARGO SPACE COVER

(71) Applicant: Ford Global Technologies, LLC, Dearborn, MI (US)

(72) Inventors: Alejandro Rosas Vazquez, Mexico City (MX); Maria Fernanda Medina Luna, Naucalpan (MX)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/838,416

(22) Filed: Jun. 13, 2022

(65) Prior Publication Data

US 2023/0398940 A1 Dec. 14, 2023

(51) Int. Cl.
*B60R 5/04* (2006.01)

(52) U.S. Cl.
CPC .................... *B60R 5/045* (2013.01)

(58) Field of Classification Search
CPC ........................................... B60R 5/045
USPC ......................................... 296/37.16
See application file for complete search history.

(56) References Cited

U.S. PATENT DOCUMENTS

| 5,103,515 | A | 4/1992 | Bird |
| 6,401,995 | B1 | 6/2002 | Yuille et al. |
| 7,806,453 | B2 * | 10/2010 | Aebker ................... B60R 11/00 296/37.16 |
| 9,487,248 | B1 * | 11/2016 | Buckhalt .................. B60J 7/141 |
| 9,827,916 | B1 | 11/2017 | Singer |
| 10,173,596 | B2 | 1/2019 | Ferreira Yanez et al. |
| 10,414,256 | B2 | 9/2019 | Frederick et al. |
| 2016/0325686 | A1 * | 11/2016 | Krishnan ................ B60R 5/047 |

FOREIGN PATENT DOCUMENTS

CZ 2020176 A3 * 11/2021 ............. B60R 5/045

* cited by examiner

*Primary Examiner* — Joseph D. Pape
(74) *Attorney, Agent, or Firm* — Vichit Chea; Price Heneveld LLP (57) ABSTRACT

A cargo space cover for a vehicle, the cargo space cover comprising a body comprising a first panel, a second panel, a tote bottom, a first tote wing, and a second tote wing; and at least one coupling portion. The cargo space cover operates in a cover configuration and a tote configuration. While the at least one coupling portion of each the first edge of the first panel and the second edge of the second panel each couple to an a first side wall of the interior of the vehicle and a second side wall of the interior of the vehicle, the cargo space cover is held in the cover configuration. While two of the first panel, the second panel, and the tote bottom operably couple to each of the first tote wing and the second tote wing the cargo space cover is held in the tote configuration.

19 Claims, 5 Drawing Sheets

MULTIFUNCTIONAL CARGO SPACE COVER

FIELD OF THE DISCLOSURE

The present disclosure generally relates to a cargo space cover for a vehicle, in particular a cargo space cover that transforms between a cover configuration and a tote configuration.

BACKGROUND OF THE DISCLOSURE

Cargo space covers are commonly used on motor vehicles. Some cargo space covers may transform, wherein they transform from a cover configuration while in use and to a stowed configuration while not in use. Such cargo space covers remain in the vehicle. However, such cargo space covers are limited in that they are purposeless if they are not in the cover configuration.

SUMMARY OF THE DISCLOSURE

According to an aspect of the present disclosure, a cargo space cover for a cargo area of a vehicle, the cargo space cover comprising a body comprising a first panel, a second panel, a tote bottom extending between the first panel and the second panel, a first tote wing, and a second tote wing; and at least one coupling portion coupled to each the first panel and the second panel, respectively. The cargo space cover being operable between at least two configurations: a cover configuration, wherein the body extends between a first edge of the first panel and a second edge of the second panel, and wherein the at least one coupling portion of each the first edge of the first panel and the second edge of the second panel each couple to an a first side wall of the interior of the vehicle and a second side wall of the interior of the vehicle to hold the cargo space cover in the cover configuration; and a tote configuration, wherein the first panel and the second panel pivot relative to the tote bottom toward vehicle-upright positions to form an approximate U-shape, wherein the first tote wing and the second tote wing pivot relative to one of the first panel, the second panel, and the tote bottom to extend toward vehicle-upright positions to form an open-bag shape, and wherein two of the first panel, the second panel, and the tote bottom operably couples to each of the first tote wing and the second tote wing to hold the cargo space cover in the tote configuration.

Embodiments of the first aspect of the present disclosure can include any one or a combination of the following features:
 a carrying handle;
 a plurality of creases;
 the first tote wing and the second tote wing each configured to fold onto and couple with one of the first panel, the second panel, and the tote bottom;
 the body of the cargo space cover defines an opening to receive at least one item, and wherein the at least one item is retained by the tote bottom, the first tote wing, the second tote wing, the first panel, and the second tote panel;
 the cargo space cover divides a cargo area of the vehicle horizontally while held in the cover configuration, such that an upper cargo space region and a lower cargo space region are defined;
 the cargo space cover is a flexible material, and wherein the flexible material is taut while held in the cargo cover configuration; and
 the body includes a front edge and a rear edge, wherein the front edge and the rear edge are coupled to a front connection member and a rear connection member, respectively.

According to a second aspect of the present disclosure, a cargo space cover for a cargo area of a vehicle, the cargo space cover comprising a body and at least one coupling portion coupled to each of a first edge of the body and a second edge of the body, respectively. The body being operable between at least two configurations: a cover configuration, wherein the body extends between the first edge of the body and the second edge of the body, and wherein each coupling portion couples to an interior of the vehicle to hold the cargo space cover in the cover configuration; and a tote configuration, wherein the body transforms to form an open-bag shape, and wherein a plurality of portions of the body couple to adjacent ones of the plurality of portions of the body to hold the cargo space cover in the tote configuration.

Embodiments of the second aspect of the present disclosure can include any one or a combination of the following features:
 a carrying handle;
 the plurality of portions of the body are panels with foldable creases therebetween;
 the cargo space cover has a flat bottom while in the tote configuration;
 the body of the cargo space cover defines an opening to receive at least one item while in the tote configuration, and wherein the plurality of portions of the body retain the at least one item;
 the cargo space cover divides a cargo area of the vehicle horizontally while held in the cover configuration, such that an upper cargo space region and a lower cargo space region are defined;
 the cargo space cover is a flexible material, and wherein the flexible material is taut while held in the cargo cover configuration; and
 the body includes a front edge and a rear edge, wherein the front edge and the rear edge are coupled to a front connection member and a rear connection member, respectively.

According to a third aspect of the present disclosure, a cargo space cover for a cargo area of a vehicle, the cargo space cover comprising a body and at least one coupling portion coupled to each of a first edge of the cargo space cover and a second edge of the cargo space cover, respectively, wherein the cargo space cover is held in at least one of a cover configuration and a tote configuration.

Embodiments of the third aspect of the present disclosure can include any one or a combination of the following features:
 the cargo space cover is held in the cover configuration while each of the at least one coupling portions is coupled to a first side wall of an interior of the vehicle and a second side wall of the interior of the vehicle;
 the cargo space cover is in the tote configuration while the body is shaped into an open-bag shape, and wherein the body comprises a plurality of members: a first panel, a second panel, a tote bottom, a first tote wing, and a second tote wing, and further wherein the cargo space cover is held in the tote configuration when adjacent members of the plurality of members are coupled along respective free edges; and
 the body of the cargo space cover defines an opening to receive at least one item while in the tote configuration, and wherein the body retains the at least one item inside the body while in the tote configuration These and other features, advantages, and objects of the present invention will be further understood and appreciated by those skilled in the art by reference to the following specification, claims, and appended drawings.

DETAILED DESCRIPTION OF PREFERRED EMBODIMENTS

Reference will now be made in detail to the present preferred embodiments of the disclosure, examples of which are illustrated in the accompanying drawings. Wherever possible, the same reference numerals will be used throughout the drawings to refer to the same or like parts. In the drawings, the depicted structural elements are not to scale and certain components are enlarged relative to the other components for purposes of emphasis and understanding.

As required, detailed embodiments of the present disclosure are disclosed herein; however, it is to be understood that the disclosed embodiments are merely exemplary of the invention that may be embodied in various and alternative forms. The figures are not necessarily to a detailed design; some schematics may be exaggerated or minimized to show function overview. Therefore, specific structural and functional details disclosed herein are not to be interpreted as limiting, but merely as a representative basis for teaching one skilled in the art to variously employ the present invention.

Figure 1:
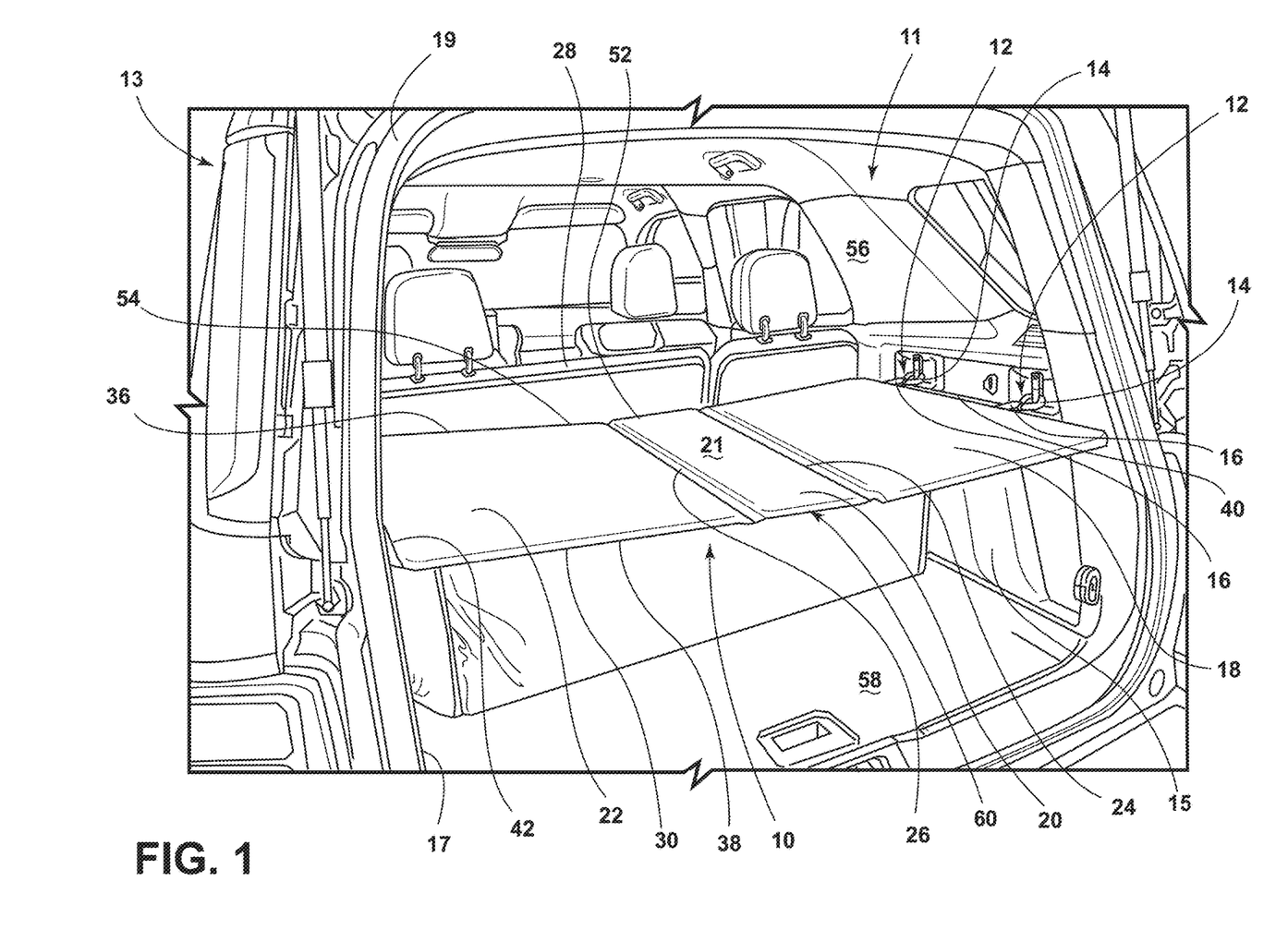
FIG. 1 is an upper rear view of a cargo space of a vehicle equipped with a cover space cover held in a cover configuration, according to one embodiment.

For purposes of description herein, the terms "upper," "lower," "right," "left," "rear," "front," "vertical," "horizontal," and derivatives thereof shall relate to the concepts as oriented in FIG. 1. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The present illustrated embodiments reside primarily in combinations of method steps and apparatus components related to a cargo space cover. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

Referring now to FIGS. 1-5, depicted is a cargo space cover 10 inside a cargo space 11 of a vehicle 13. The cargo space cover 10 comprises a body 60 comprising a first panel 18, a second panel 22, a tote bottom 20 extending between the first panel 18 and the second panel 22, a first tote wing 70, and a second tote wing 72; and at least one coupling portion 12, each shown in the form of a strap 16 with a carabineer 14 coupled to each the first panel 18 and the second panel 22, respectively; the cargo space cover 10 being operable between two configurations: a cover configuration, wherein the body extends between a first edge 40 of the first panel 18 and a second edge 42 of the second panel 22, and wherein the at least one coupling portion 12 of each the first edge 40 of the body 60 and the second edge 42 of the body 60 each couple to a first side wall 15 and a second side wall 17 of an interior of the vehicle 13 to hold the cargo space cover 10 in the cover configuration, the cargo space cover 10 is substantially planar while held in the cover configuration; and a tote configuration, wherein the first panel 18 and the second panel 22 pivot relative to the tote bottom 20 toward upright positions to form an approximate U-shape, wherein the first tote wing 70 and the second tote wing 72 pivot relative to one of the first panel 18, the second panel 22, and the tote bottom 20 to extend toward upright positions to form an open-bag shape, and wherein two of the first panel 18, the second panel 22, and the tote bottom 20 operably couples to each of the first tote wing 70 and the second tote wing 72 to hold the cargo space cover 10 in the tote configuration. Regardless of whether a top surface 21 of the body 60 is facing vehicle-upright or vehicle-downward, the body 60 can be folded such that the body 60 forms the tote configuration. The body 60 includes a thickness, t, a width, w, and a length, l, wherein the thickness, t, is less than each of the width and the length.

Referring now to FIG. 1, the vehicle 13 has an interior that includes a vehicle cargo space 11 therein contained within a vehicle body. The vehicle cargo space 11 may be positioned behind a passenger seating row 28, such as a rear seating row of seating in a rear region of the vehicle 13. Fewer or more passenger seating rows 28 may be included without departing from the teachings herein. The cargo space cover 10, as shown in FIG. 1, may be disposed in the rear cargo space, also referred to as a vehicle trunk, a cargo space 11, a front cargo space of an electric vehicle, a bed of a pickup truck, within the vehicle where a passenger seating row 28 is not in operation, and/or other cargo areas of a vehicle.

Additionally, as illustrated in FIG. 1, the cargo space cover 10 may be coupled via a plurality of coupling portions 12 to a first side wall 15 and a second side wall 17 of the interior of the vehicle cargo space 11. The first side wall 15 is laterally opposite the second side wall 17. A coupling portion 12 disposed on a second edge 42 of the cargo space cover 10 is contemplated to be substantially similar in structural design, such that the description of one coupling portion 12 within the disclosure will implicitly describe features of the other coupling portions 12 on both the first edge 40 and the second edge 42, unless otherwise noted. In FIG. 1, the cargo space cover 10 is shown in a cover configuration and held in the cover configuration by the coupling portions 12.

In various examples, the vehicle cargo space 11 is a vehicle cargo space 11 that may be within the vehicle interior of a sedan, a sport utility vehicle, a truck, a van, a crossover, and/or other styles of vehicles. The vehicle cargo space 11 may be within the vehicle interior of a manually operated vehicle (e.g., with a human driver), fully autonomous vehicle (e.g., no human driver), or partially autonomous vehicle (e.g., may be operated with or without a human driver). The cargo space cover 10 comprises a body 60 and at least one coupling portion 12, shown and described herein as four straps 16 with four carabineers 14, according to one embodiment. In some embodiments, the body 60 is a flexible material, such as nylon, for example. The body 60 may comprise panels of more rigid materials, such as cardboard, wood, polymeric materials, metals, and/or other styles of panel materials. In some embodiments, the at least one coupling portion 12 may be a track, a zipper, hook-and-loop connections, buttons, snaps, and/or other styles of operable connecting apparatuses. Additionally, or alternatively, the at least one coupling portion 12 may be integrally formed into the body 60 of the cargo space cover 10, such as coupling apertures, for example. In some embodiments, the body 60 may comprise a first panel 18, a second panel 22, a first tote wing 70, a second tote wing 72, a tote bottom 20, and creases therebetween, wherein the first tote wing 70 and the second tote wing 72 are spaced by the first panel 18, and wherein the first panel 18 and the second panel 22 are spaced by the tote bottom 20. The cargo space cover 10, as shown in FIG. 1, may be held in a cover configuration by operably coupling the coupling portions 12 to the vehicle interior. The body 60, as shown in FIG. 1, extends between a second edge 42 and a first edge 40, wherein the coupling portions 12 are coupled to each of the second edge 42 and the first edge 40. In some embodiments, the body 60 may extend between the passenger seat row 28 and a rim 19 of the cargo space 11. In some embodiments a rear edge 36 of the body 60 directly abuts the passenger seating row 28 and a front edge 38 of the body 60 directly abuts the rim 19 of the cargo space 11. In some embodiments the rear edge 36 directly abuts the rim 19, and the front edge 38 directly abuts the passenger seating row 28. Additionally, or alternatively, the body 60 may be any practicable size, so long as the body 60 allows for coupling the at least one coupling portion 12 of the second edge 42 and the first edge 40 with the vehicle 13.

The cargo space 11 has an upper region 56 and a lower region 58 divided by the cargo space cover 10. The cargo space cover 10 can divide the cargo space 11 into the upper region 56 and the lower region 58 as shown in FIG. 1. Additionally, or alternatively, the cargo space cover 10 can divide the cargo space 11 into the upper region 56 and the lower region 58 when it is rotated such that the top surface 21 faces vehicle-downward, the rear edge 36 faces vehicle-forward, or the first edge 40 faces the second side wall 17 of the cargo space 11, so long as the at least one coupling portion 12 of each of the first edge 40 and the second edge 42 allows for coupling to a first side wall 15 of the cargo space 11 or a second side wall 17 of the cargo space 11. Additionally, or alternatively, the at least one coupling portion 12 of each of the first edge 40 and the second edge 42 may couple to a rear side of the passenger seat row 28 and a cargo space door, such as a tailgate door, for example.

Figure 2:
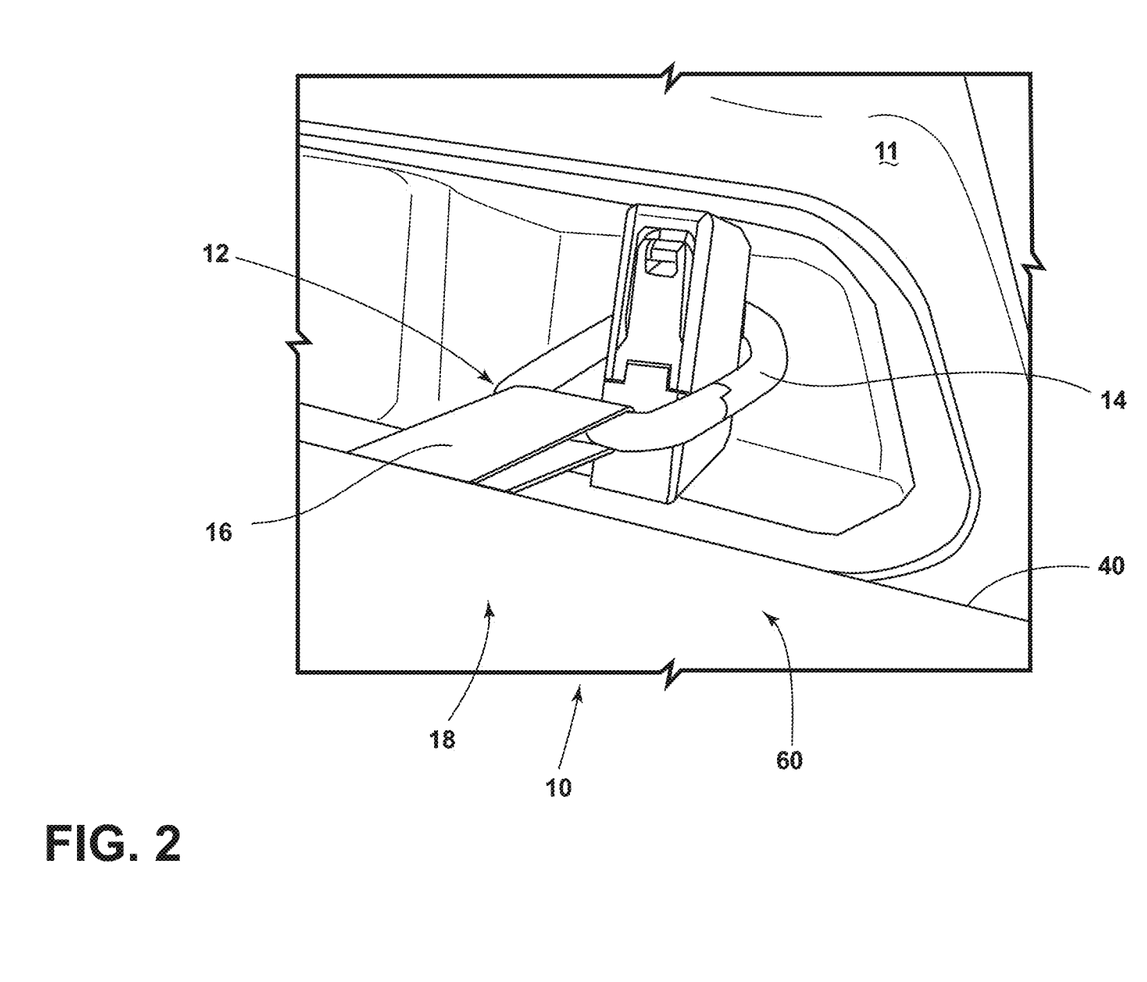
FIG. 2 is an enlarged view of a coupling portion coupled to the cargo space cover and operably coupled to an interior of the vehicle.

Referring to FIG. 2, the cargo space cover 10 comprises at least one coupling portion 12, shown and described herein as a strap 16 with a carabineer 14 connected thereto, according to one embodiment. In one example, the strap 16 and the body 60 are made of a flexible material, such as nylon, for example. The strap 16 and the body 60 are held taut when the cargo space cover 10 is held in the cover configuration when the at least one coupling portion 12 of each of the first edge 40 and the second edge 42 couples with one of the first side wall 15 and the second side wall 17, respectively. Additionally, or alternatively, the at least one coupling portion 12 may be a zipper, a hook-and-loop connection, a button, a track, or other connection apparatus.

Figure 3A:
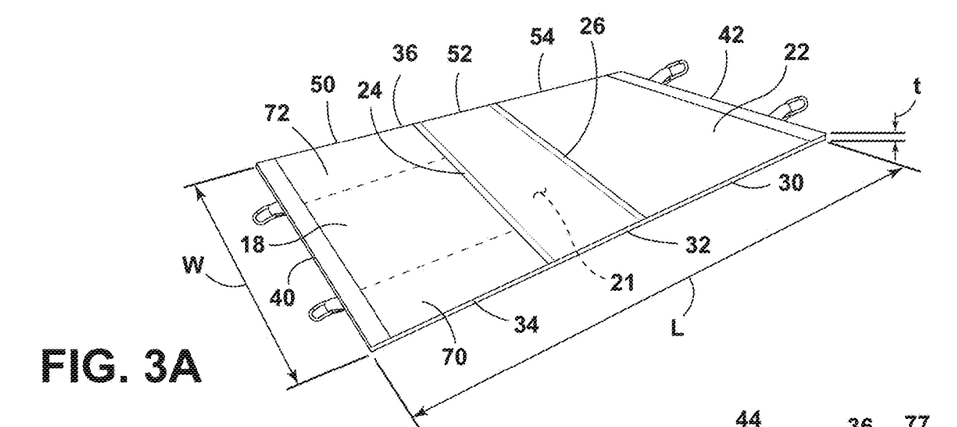
FIG. 3A is top perspective view of the cargo space cover in the cover configuration.

Referring to FIG. 3A, the body 60 of the cargo space cover 10 comprises a first panel 18, a second panel 22, a tote bottom 20, a first tote wing 70, and a second tote wing 72, shown and described herein, according to one embodiment. However, the body 60 may comprise fewer or additional body portions. The body 60 of the cargo space cover 10 comprises a first wing-panel crease 34, a second wing-panel crease 50, a first panel-bottom crease 24, and a second panel-bottom crease 26, shown and described herein, according to one embodiment. In some examples, the plurality of portions of the body 60 can pivot along each of the plurality creases of the body 60. While the cargo space cover 10 is in the cover configuration, the first tote wing 70 and the second tote wing 72 may be disposed on the first panel 18. In other examples, the first tote wing 70 and the second tote wing 72 may each be disposed on one of the tote bottom 20, the second panel 22, and other similar conceivable body portions.

Figure 3B:
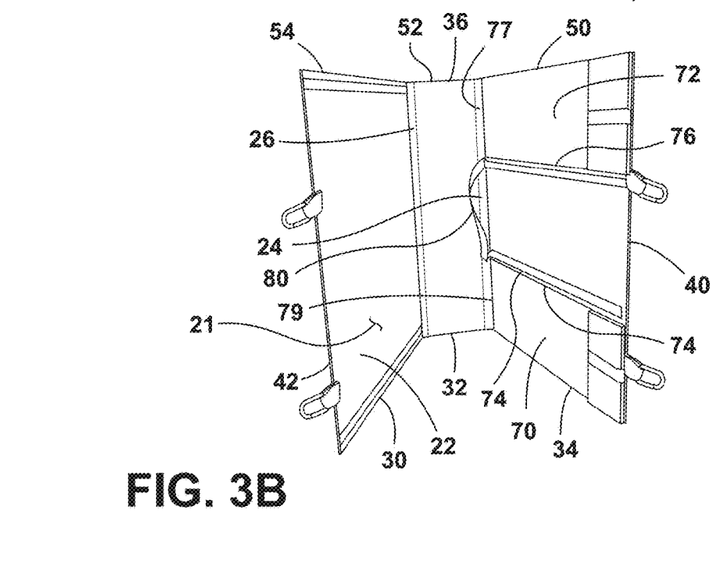
FIG. 3B is a perspective view of the cargo space cover in a partially folded U-shape between the cover configuration and a tote configuration.

Referring to FIG. 3B, when the cargo space cover 10 is in an intermediate configuration between the cover configuration and the tote configuration, the first panel 18 is pivoted along the first panel-bottom crease 24 such that the first panel 18 is not planar with the tote bottom 20. The second panel 22 is pivoted along the second panel-bottom crease 26 such that the second panel 22 is not planar with the tote bottom 20, and the second panel 22, the tote bottom 20, and the first panel 18 form an approximate first U-shape.

Figure 3C:
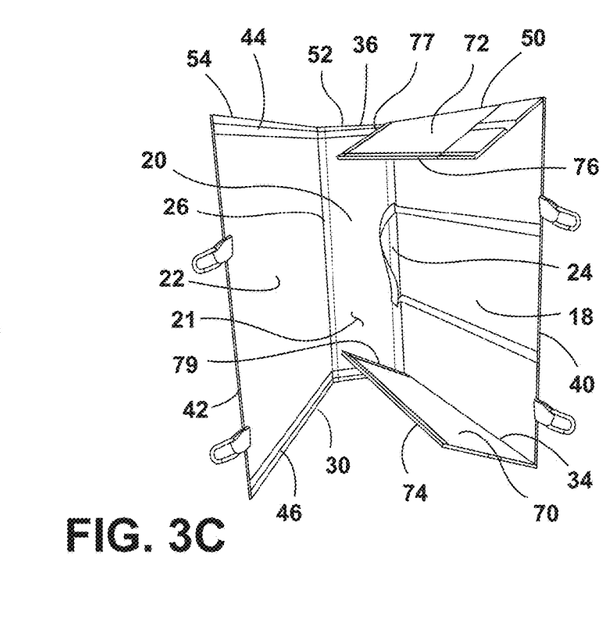
FIG. 3C is a perspective view of the cargo space cover in a further folded U-shape between the cover configuration and the tote configuration with a first tote wing and a second tote wing each in intermediate extended positions.

Referring to FIG. 3C, the first tote wing 70 includes a first tote wing side edge 74, a first tote wing top edge, and a first tote wing bottom edge 79. The second tote wing 72 includes a second tote wing side edge 76, a second tote wing top edge, and a second tote wing bottom edge 77. The tote bottom includes a tote bottom front edge 32 and a tote bottom rear edge 52. The second panel 22 includes a second panel front edge 30 and a second panel rear edge 54. When the cargo space cover 10 is in the intermediate configuration between the cover configuration and the tote configuration, the first tote wing 70 is pivoted along the first wing-panel crease 34 such that the first tote wing 70 is not planar with the first panel 18. The second tote wing 72 is pivoted along the second wing-panel crease 50 such that the second tote wing 72 is not planar with the first panel 18, and such that the first tote wing 70, the first panel 18, and the second tote wing 72 form an approximate second U-shape; and such that the first panel 18, the second panel 22, the first tote wing 70, the second tote wing 72, and the tote bottom 20 form an open-bag shape.

Figure 4:
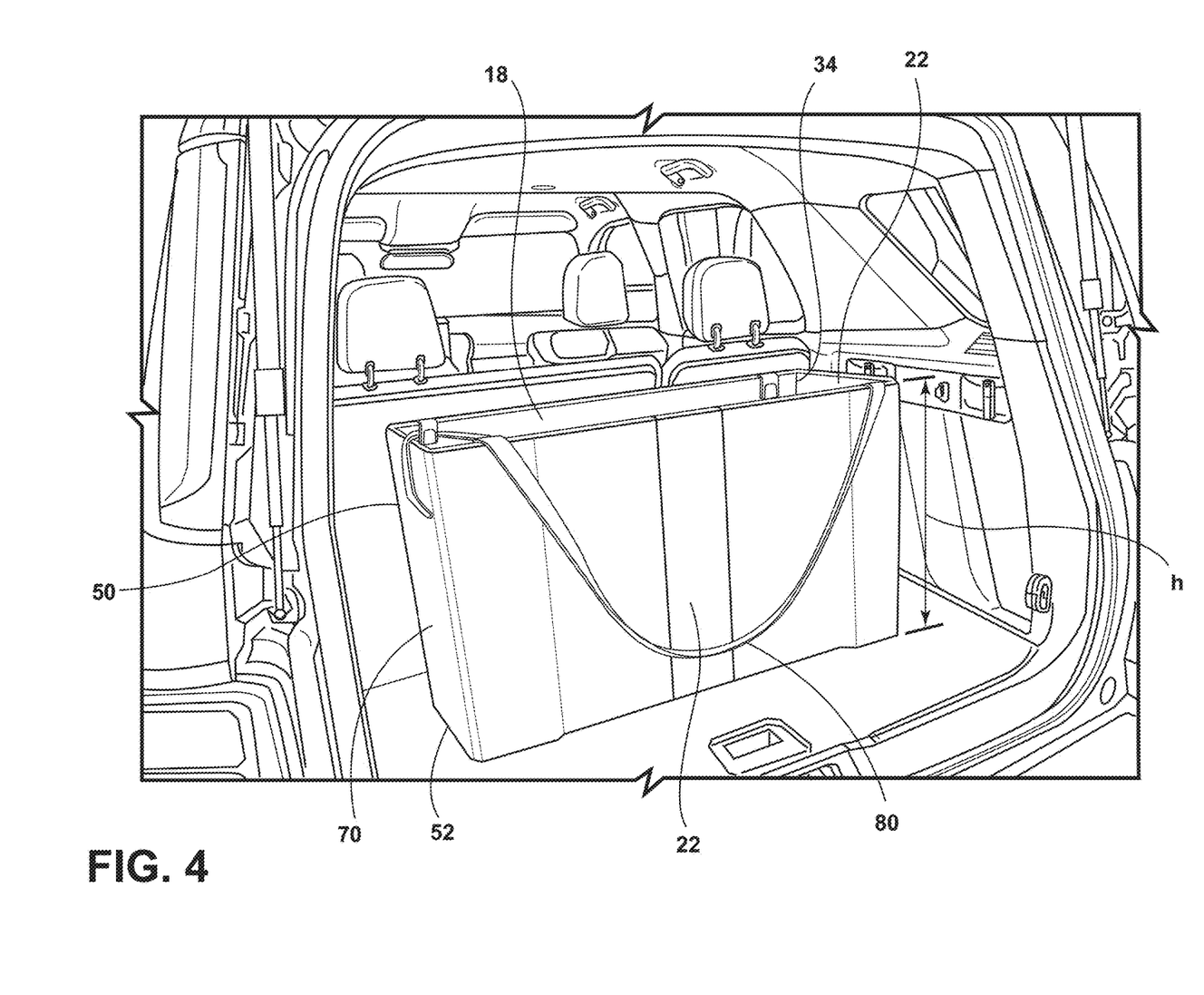
FIG. 4 is an upper rear view of the cargo space cover held in the tote configuration in the cargo space of the vehicle.

Referring to FIG. 4, a first tote wing side edge 74, a first tote wing bottom edge 79, a tote bottom front edge 32, a second panel front edge 30, are all coupled with a front connection member 44. Meanwhile, a second tote wing side edge 76, a second tote wing bottom edge 77, a tote bottom rear edge 52, and a second panel rear edge 54 are all coupled with a rear connection member 46, shown and described herein, according to one embodiment. The front connection member 44 and the rear connection member 46 may be at least one of a zipper, a hook-and-loop connection, button, and other similar conceivable connections apparatuses. While the cargo space cover 10 is formed into the open-bag shape, the first tote wing side edge 74 may directly abut the second panel front edge 30, the second tote wing side edge 76 may directly abut the second panel rear edge 54, the first tote wing bottom edge 79 may directly abut the tote bottom front edge 32, and the second tote wing bottom edge 77 may directly abut the tote bottom rear edge 52 to form the cargo space cover 10 into the tote configuration. The cargo space cover 10 may then be held in the tote configuration by coupling the front connection member 44 along the first tote wing side edge 74 to the front connection member 44 along the second panel front edge 30, coupling the rear connection member 46 along the second tote wing side edge 76 to the rear the connection member 46 along the second panel rear edge 54, coupling the front connection member 44 along the first tote wing bottom edge 79 to the front connection member 44 along the tote bottom front edge 32, and coupling the rear connection member 46 along the second tote wing bottom edge 77 to the rear connection member 46 along the tote bottom rear edge 52, as shown and described herein, according to one embodiment. The first panel 18, the second panel 22, the first tote wing 70, and the second tote wing 72 may each extend vehicle-upright from the tote bottom 20 a similar distance, h. The first panel 18, the second panel 22, the first tote wing 70, and the second tote wing 72 may each extend vehicle-upright from the tote bottom 20 an equal distance h.

Additionally, the cargo space cover 10 may include a carrying handle 80, shown and described herein as a sash coupled to an upper open end of the tote configuration, according to one embodiment. An entire length of the carrying handle 80 may be coupled with the body 60 while not in use. Additionally, or alternatively, the carrying handle 80 may be an aperture on the body 60 of the cargo space cover 10, a plurality of handles extending from the body 60, or other similar conceivable carrying features. The carrying handle 80 may be coupled to at least one of the first tote wing 70, the second tote wing 72, the first panel 18, the second panel 22, and the tote bottom 20.

Figure 5:
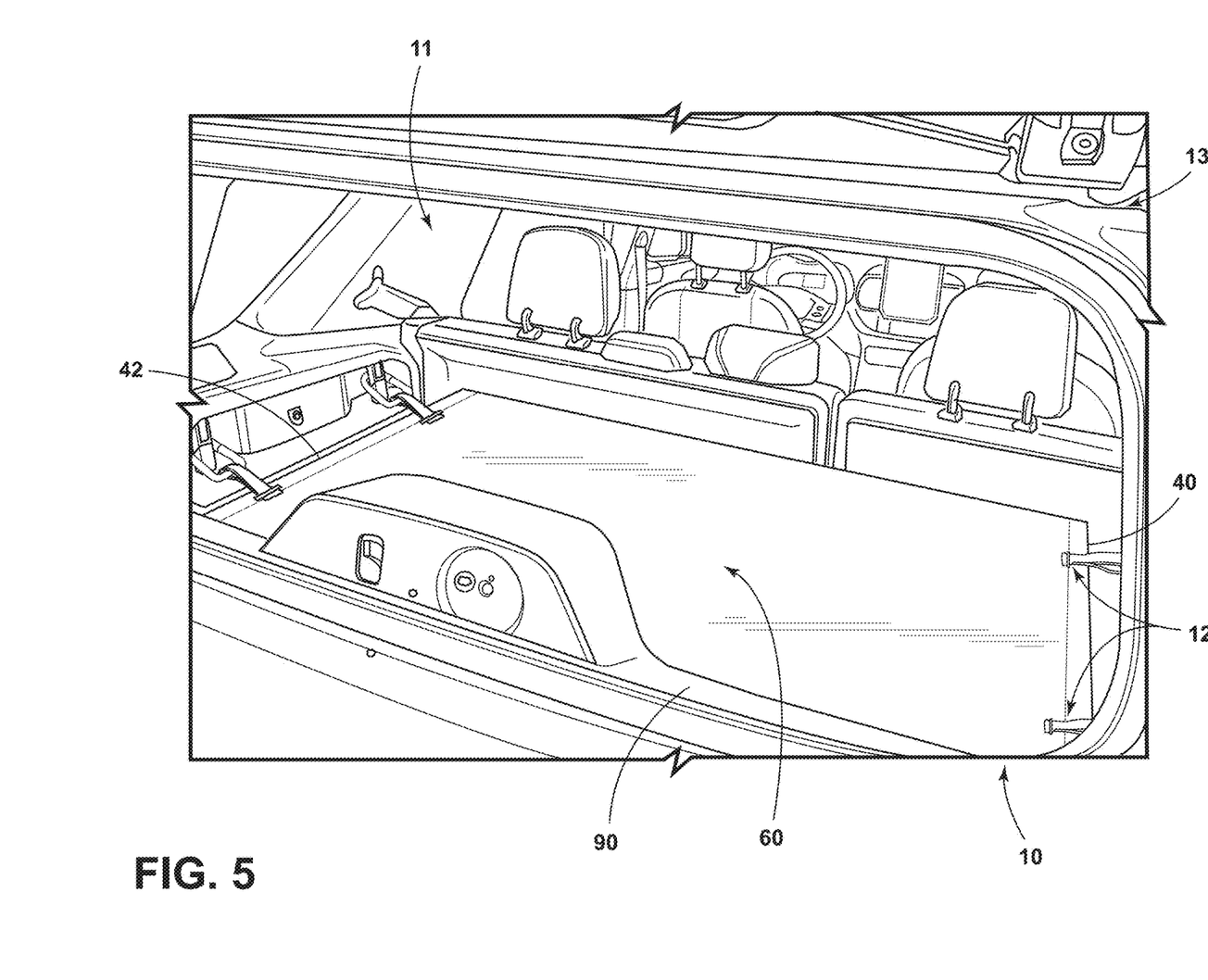
FIG. 5 is an upper rear view of the cargo space cover held in the cover configuration in the cargo space of the vehicle and accessible from an open, rear window.

Use of the presently disclosed cargo space cover 10 may provide for a variety of advantages. For example, the cargo space cover 10 may be coupled to the interior of the vehicle 13 to provide shade over items below the cargo space cover 10. The cargo space cover 10 while held in the cover configuration may also hold items on top of the cargo space cover 10. The cargo space cover 10 is of a size and shape such that as few as one user can carry the cargo space cover 10 while in the tote configuration and the cover configuration. The cargo space cover 10 is even accessible through openable rear windows 90.

For purposes of this disclosure, the term "coupled" (in all its forms, couple, coupling, coupled, etc.) generally means the joined of two components (electrical or mechanical) directly or indirectly to one another. Such joining may be stationary in nature or movable in nature. Such joining may be achieved with two components (electrical or mechanical) and any additional intermediate members being integrally formed as a single unitary body with one another or with the two components. Such joining may be permanent in nature or may be removable or releasable in nature unless otherwise stated.

Furthermore, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected" or "operably coupled" to each other to achieve the desired functionality, and any two components capable of being so associated can also be viewed as being "operably couplable" to each other to achieve the desired functionality. Some examples of operably couplable include, but are not limited to, physically mateable and/or physically interacting components and/or wirelessly interactable and/or wirelessly interacting components and/or logically interacting and/or logically interactable components. Furthermore, it will be understood that a component preceding the term "of the" may be disposed at any practicable location (e.g., on, within, and/or externally disposed from the vehicle) such that the component may function in any manner described herein.

Modifications of the disclosure will occur to those skilled in the art and to those who make use of the disclosure. Therefore, it is understood that the embodiments shown in the drawings and described above are merely for illustrative purposes and not intended to limit the scope of the disclosure, which is defined by the following claims, as interpreted according to the principles of patent law, including the doctrine of equivalents.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A cargo space cover for a cargo area of a vehicle, the cargo space cover comprising:
    a body comprising:
        a first panel;
        a second panel;
        a tote bottom extending between the first panel and the second panel;
        a first tote wing; and
        a second tote wing; and
    at least one coupling portion coupled to each the first panel and the second panel, respectively;
    the cargo space cover being operable between at least two configurations including:
        a cover configuration, wherein the body extends between a first edge of the first panel and a second edge of the second panel, and wherein the at least one coupling portion of each the first edge of the body and the second edge of the body each couple to a first side wall of an interior of the vehicle and a second side wall of the interior of the vehicle to hold the cargo space cover in the cover configuration; and
        a tote configuration, wherein the first panel and the second panel pivot relative to the tote bottom toward upright positions to form an approximate U-shape with a planar bottom, wherein the first tote wing and the second tote wing pivot relative to one of the first panel, the second panel, and the tote bottom to extend toward upright positions to form an open-bag shape, and wherein two of the first panel, the second panel, and the tote bottom operably couples to each of the first tote wing and the second tote wing to hold the cargo space cover in the tote configuration.

2. The cargo space cover of claim 1 further comprising a carrying handle, the handle being exposed in the tote configuration and disposed in the cover configuration.

3. The cargo space cover of claim 1 further comprising a plurality of creases.

4. The cargo space cover of claim 1, wherein the first tote wing and the second tote wing fold onto and couple with one of the first panel, the second panel, and the tote bottom.

5. The cargo space cover of claim 1, wherein the body of the cargo space cover defines an opening to receive at least one item, and wherein the at least one item is retained by the tote bottom, the first tote wing, the second tote wing, the first panel, and the second tote panel.

6. The cargo space cover of claim 1, wherein the cargo space cover divides a cargo area of the vehicle horizontally while held in the cover configuration, such that an upper cargo space region and a lower cargo space region are defined.

7. The cargo space cover of claim 1, wherein the cargo space cover is a flexible material, and wherein the flexible material is taut while held in the cargo cover configuration.

8. The cargo space cover of claim 1, wherein the body includes a front edge and a rear edge, wherein the front edge and the rear edge are coupled to a front connection member and a rear connection member, respectively.

9. A cargo space cover for a cargo area of a vehicle, the cargo space cover comprising:
    a body; and
    at least one coupling portion coupled to each of a first edge of the body and a second edge of the body, respectively;
    the body being operable between at least two configurations including:
        a cover configuration, wherein the body extends between the first edge of the body and the second edge of the body, and wherein each coupling portion couples to an interior of the vehicle to hold the cargo space cover in the cover configuration; and
        a tote configuration, wherein the body transforms to form an open-bag shape having a planar bottom, and wherein a plurality of panels of the body couple to adjacent ones of the plurality of panels of the body to hold the cargo space cover in the tote configuration.

10. The cargo space cover of claim 9 further comprising a carrying handle, the handle selectively disposed against the tote bottom.

11. The cargo space cover of claim 9, wherein the plurality of portions of the body are panels with foldable creases therebetween.

12. The cargo space cover of claim 9, wherein the cargo space cover has a flat bottom while in the tote configuration.

13. The cargo space cover of claim 9, wherein the body of the cargo space cover defines an opening to receive at least one item while in the tote configuration, and wherein the plurality of portions of the body retain the at least one item.

14. The cargo space cover of claim 9, wherein the cargo space cover divides a cargo area of the vehicle horizontally while held in the cover configuration, such that an upper cargo space region and a lower cargo space region are defined.

15. The cargo space cover of claim 9, wherein the cargo space cover is a flexible material, and wherein the flexible material is taut while held in the cargo cover configuration.

16. The cargo space cover of claim 9, wherein the body includes a front edge and a rear edge, wherein the front edge and the rear edge are coupled to a front connection member and a rear connection member, respectively.

17. A cargo space cover for a cargo area of a vehicle, the cargo space cover comprising:
    a body; and
    at least one coupling portion coupled to each of a first edge of the cargo space cover and a second edge of the cargo space cover, respectively, wherein the cargo space cover is held in at least one of a cover configuration and a tote configuration, wherein the cargo space cover is in the tote configuration while the body is shaped into an open-bag shape having a planar bottom, and wherein the body comprises a plurality of panels: a first panel, second panel, a tote bottom, a first tote wing, and a second tote wing, and further wherein the cargo space cover is held in the tote configuration when adjacent panels of the plurality of panels are coupled along respective free edges.

18. The cargo space cover of claim 17, wherein the cargo space cover is held in the cover configuration while each of the at least one coupling portions is coupled to a first side wall of an interior of the vehicle and a second side wall of the interior of the vehicle.

19. The cargo space cover of claim 17, wherein the body of the cargo space cover defines an opening to receive at least one item while in the tote configuration, and wherein the body retains the at least one item inside the body while in the tote configuration.

* * * * *